United States Patent
Carro et al.

(10) Patent No.: US 6,941,461 B2
(45) Date of Patent: Sep. 6, 2005

(54) SYSTEM AND METHOD OF UNIQUELY AUTHENTICATING EACH REPLICATION OF A GROUP OF SOFT-COPY DOCUMENTS

(75) Inventors: Fernando Incertis Carro, Valencia (ES); Stephen Matyas, Manassas, VA (US)

(73) Assignee: International Business Machines Corporation, Armonk, NY (US)

(*) Notice: Subject to any disclaimer, the term of this patent is extended or adjusted under 35 U.S.C. 154(b) by 766 days.

(21) Appl. No.: 09/852,174

(22) Filed: May 9, 2001

(65) Prior Publication Data

US 2001/0042206 A1 Nov. 15, 2001

(30) Foreign Application Priority Data

May 12, 2000 (EP) .............................................. 00480041

(51) Int. Cl.⁷ ................................................. H04L 9/08
(52) U.S. Cl. ........................ 713/181; 713/165; 713/166; 713/167; 713/170; 713/176; 380/51; 380/268; 380/269
(58) Field of Search ................................ 713/165–167, 713/181, 176, 170; 380/51, 268, 269

(56) References Cited

U.S. PATENT DOCUMENTS

| | | | | | |
|---|---|---|---|---|---|
| 5,319,710 A | * | 6/1994 | Atalla et al. | .................. | 705/75 |
| 6,128,737 A | * | 10/2000 | Jakubowski et al. | ........ | 713/181 |
| 6,785,738 B1 | * | 8/2004 | Ivaturi | ........................ | 709/245 |

FOREIGN PATENT DOCUMENTS

| | | | | | |
|---|---|---|---|---|---|
| WO | WO 94/21066 | * | 9/1994 | ............. | H04L/9/26 |
| WO | WO 00/08541 | * | 2/2000 | ............. | G06F/1/00 |
| WO | WO 01/11818 A2 | * | 2/2001 | ............. | H04L/9/00 |

OTHER PUBLICATIONS

Jueneman et al., "Message Authentication", Sep. 1985, vol. 23, No. 9, pp. 29–40.*
Krawczyk et al., "HMAC: Keyed–Hashing for Message Authentication", Network Working Group, Feb. 1997, pp. 1–9.*
http://www.graphcomp.com/info/specs/ms/pct.html; Benaloh et al., "The Private Communication Technology (PCT) Protocol", Oct. 1995.*
Schneier, "Applied Cryptography, Protocols, Algorithm, and Source Code in C", 1996, John Wiley & Sons, Second Edition, pp. 31, 455–459.*
Bender et al., "Techniques for Data Hiding", 1996, IBM Systems Journal, vol. 35, pp. 313–336.*

* cited by examiner

*Primary Examiner*—Gregory Morse
*Assistant Examiner*—Tongoc Tran
(74) *Attorney, Agent, or Firm*—Louis P. Herzberg; Anne Vachon Dougherty (57) ABSTRACT

A system and method for unique authentication of each replication of a plurality of soft-copy documents, forming a group. One soft-copy document, out of the group, becomes a carrier for an authentication code aimed at protecting the group. The authentication code is computed from the concatenation of the plurality of soft-copy documents and a key. A random number is also generated for each replication of the group of files. The random number is combined with the authentication code to mark the soft-copy document which has been selected to become the carrier. Thus, the invention introduces randomization in the insertion of the authentication code so that for each replication of an identical group of data files, unique authentication data can be associated, merged and hidden in the transmitted information.

18 Claims, 6 Drawing Sheets

SYSTEM AND METHOD OF UNIQUELY AUTHENTICATING EACH REPLICATION OF A GROUP OF SOFT-COPY DOCUMENTS

FIELD OF THE INVENTION

The present invention relates to the field of document authentication and more particularly applies to a system and method in which one soft-copy document, out of a group of associated documents, acts as the carrier of the integrity information aimed at uniquely authenticating each replication of the group.

BACKGROUND OF THE INVENTION

The current environment of computer networks is characterized by an exponential growth in the circulation of soft-copy or electronic documents. They include plain text documents or text-like document e.g., ASCII (American Standard Code for Information Interchange) coded files and more generally data files such as the ones corresponding to the coding of images e.g., according to the JPEG (Joint Picture Expert Group) standard compression algorithm. However, because this has to take place over unsecured media especially, the Internet, a key issue becomes authentication. It should be possible for the recipient of a document to ascertain its origin so that no one should be able to masquerade as someone else. Also, it should be possible to verify that a document has not been modified, accidentally or maliciously, en route. To this end the standard solution; which goes well with any form of electronic document since, whatever method is used to code the information, the end result is just a binary data file, consists in concatenating a MAC or Message Authentication Code to the soft-copy document files. A MAC is a digest computed with a one-way hash function over a coded binary file, which is also made dependent on a key (e.g., a secret-key known only to the sender and the recipient) so that the recipient can check first, that what has been received originated with the one whom shares the secret-key and second, that the document has not been altered.

For example, Secure Hash Algorithm or SHA specified by the National Institute of Standards and Technologies, NIST, FIPS PUB 180-1, "Secure Hash Standard", US Dpt of Commerce, May 93, produces a 160-bit hash. It may be combined with a key, for example through the use of a mechanism referred to as HMAC or Keyed-Hashing for Message Authentication, subject of the RFC (Request For Comment) of the IETF (Internet Engineering Task Force) under the number 2104. HMAC is devised so that it can be used with any iterative cryptographic hash function, including SHA. Therefore, a MAC can be appended to a document file so that the whole can be checked by the recipient. Thus, this method assumes the addition of checking information to an existing file after the information to be transmitted has been coded. This has the inconvenience of indeed clearly separating the file content information from its checking part. Hence, this latter can easily be isolated and removed intentionally, in an attempt to cheat, or accidentally, due to the fact that the intermediate pieces of equipment which are in charge of forwarding the electronic documents are not devised to manipulate this extra piece of information.

Yet another key issue, with a public communications network such as the Internet, is privacy and confidentiality. Not all of the information circulating between end users, be it comprised of texts, images or is a combination of, should be made public. The standard answer to this issue rests on cryptography. That is, information files that must be kept secret are encrypted before transmission. DES (Data Encryption Standard) is the standard encryption algorithm that has been in use for two decades to encrypt and decrypt data files. It operates on 64-bit blocks of data, using a symmetric secret-key to be shared by those involved. DES is identical to the ANSI standard Data Encryption Algorithm (DEA) defined in ANSI X3.92-1981.

Authenticating encrypted files is conducted just as with non-encrypted files i.e., a MAC is computed and concatenated to what remains intrinsically a binary data file. Hence, another disadvantage of computing integrity information on data is that the integrity information itself reveals some information about the data on which it is computed. Unless the key is changed, the integrity information computed on the data remains constant. Therefore, if an eavesdropper observes the same transmitted MAC, he/she can be certain that the same encrypted message was transmitted. In applications where pre-formatted files are repeatedly forwarded (e.g., the same coded images or coded pieces of music), a simple frequency analysis performed on the intercepted MAC values may reveal a pattern in the transmitted messages. Similarly, one or a set of encrypted files sent only once to many destinations can unveil what group has received common information.

Hence, it would be advantageous firstly, to introduce randomization into the process so that MAC values are constantly changing and secondly, to allow the hiding of MACs in the transmitted information thereby completely preventing an adversary from learning anything through the observation of the forwarded data. If this result could be partially obtained (randomization could be achieved this way) by changing the keys, wherein the key to compute the MAC would be different for each transmitted copy of identical data file(s) and/or for each different destination, the process would severely impact the key management system, since it would be necessary to first distribute the secret keys through a separate channel, which is a burdensome task.

Thus, it is a broad object of the invention to remedy the shortcomings of the prior art as described here above.

It is another object of the invention to disclose a method and a system which introduce randomization in the insertion of a MAC so that, for each replication of a same group of data files, unique authentication data can be associated.

It is still another object of the invention to allow authentication data to be merged and hidden in the transmitted information.

It is a further object of the invention that the process be implemented transparently, without the need for having to distribute more secret-keys than usually required to perform encryption and authentication.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The foregoing and other objects are realized by the present invention comprising a method and a system for uniquely authenticating each replication of a plurality of soft-copy documents, forming a group. The method first selects one soft-copy document, out of the group, to become a carrier for an authentication code aimed at protecting the group. The soft-copy documents are concatenated, using a canonical form of the selected soft-copy document, so that checking can later be successfully performed. Then, the authentication code is computed from the concatenation of the plurality of soft-copy documents and a key. A random number is also generated for each replication of the group of files. It is combined with the authentication code to mark the selected soft-copy document so as to obtain the carrier. A method for checking the authentication code is also disclosed. Thus, the invention introduces randomization in the insertion of an authentication code so that, for each replication of an identical group of data files, unique authentication data can thus be associated. The invention also permits merging and hiding codes in the transmitted information.

DETAILED DESCRIPTION OF THE PREFERRED EMBODIMENT

Figure 1:
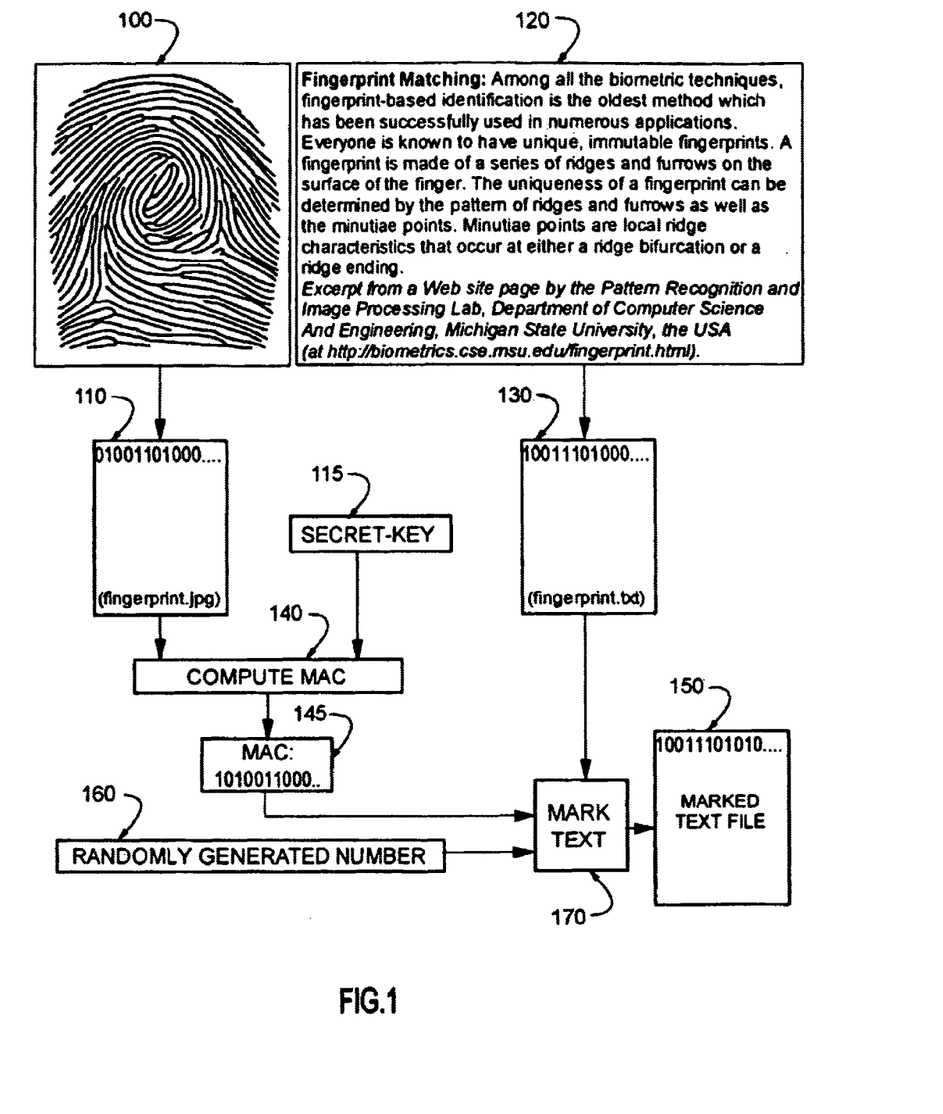
FIG. 1 is a simple example of how the invention can be carried out.

FIG. 1 illustrates how the invention can be better carried out through an exemplary application. A first document, here a picture of a fingerprint [100], is encoded into a data file formatted, for example according to the JPEG (Joint Photographic Experts Group) standard image compression algorithm thus producing a data file [100] called, for example, fingerprint.jpg. Associated with this image is a second document, for example a text [120], giving some explanation on what are fingerprints. The text document is also coded into a file. e.g., a simple ASCII file 'fingerprint.txt' [130]. Then, the first document, the fingerprint image [100], can be protected by computing [140] a MAC (Message Authentication Code) using the file message [110] and a key [115] as inputs through any method well-known from the art thus, obtaining a unique digest or MAC [145] (i.e., a binary vector made of 1's and 0's). Next, instead of appending the MAC to the fingerprint file, it is used, along with a randomly generated number [160], to transparently mark [170] the image companion text file [130] in a unique way, as explained in the following figures, in order to fulfill the objectives of the invention for randomizing and hiding the authentication data. Therefore, the second document acts as a carrier [150] for the authentication data.

Figure 2:
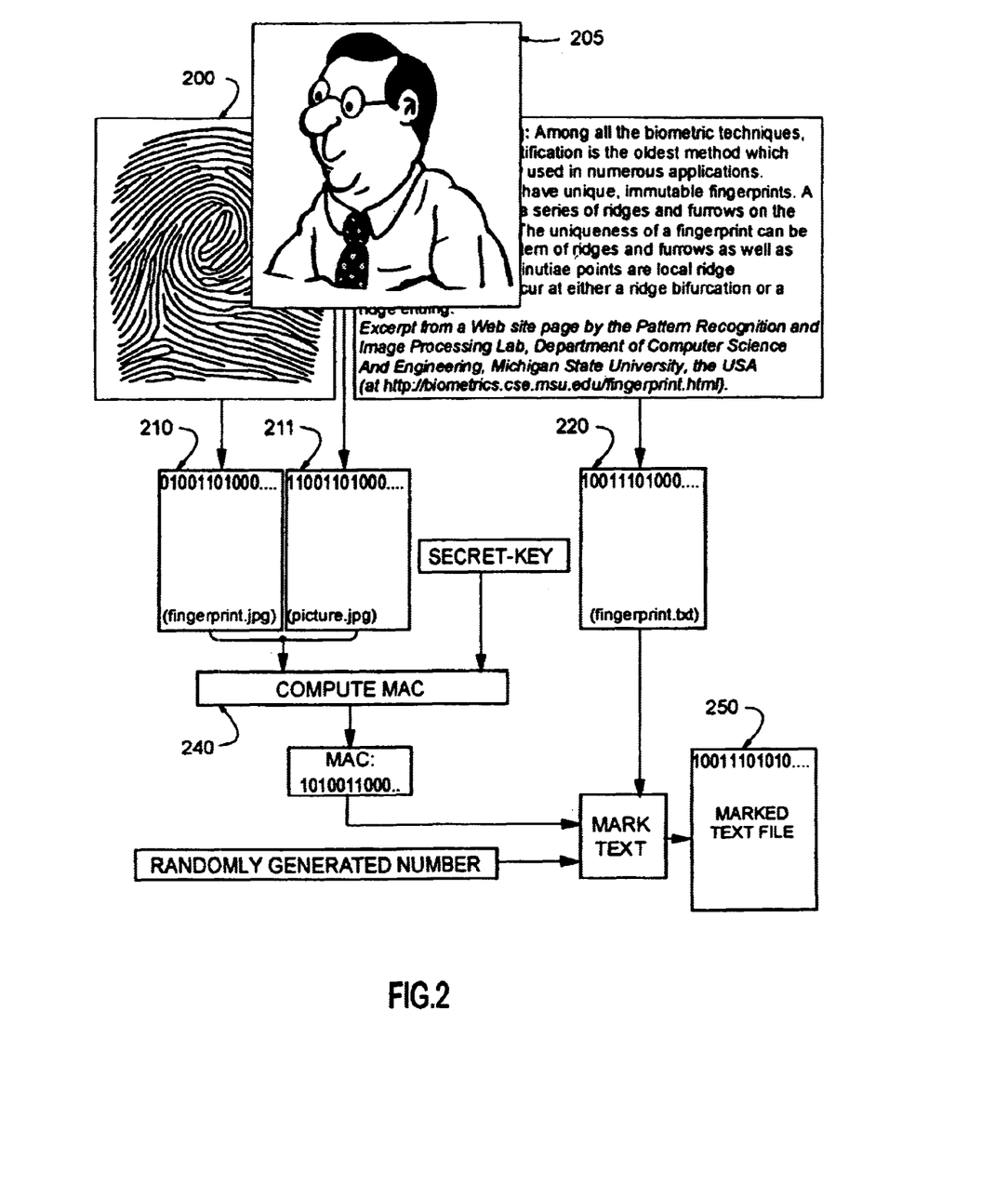
FIG. 2 shows that more files can be associated in a group.

FIG. 2 illustrates the fact that more than two documents can be involved. As an example, a picture of the person [205] whose fingerprint is shown [200] can also be associated so that a MAC is computed [240] over the concatenated picture files [210, 211] then merged into the text file [230] so that both together can be authenticated through the decoding of the marked companion text [250] upon reception of the three associated files [210, 211, 250].

Figure 3:
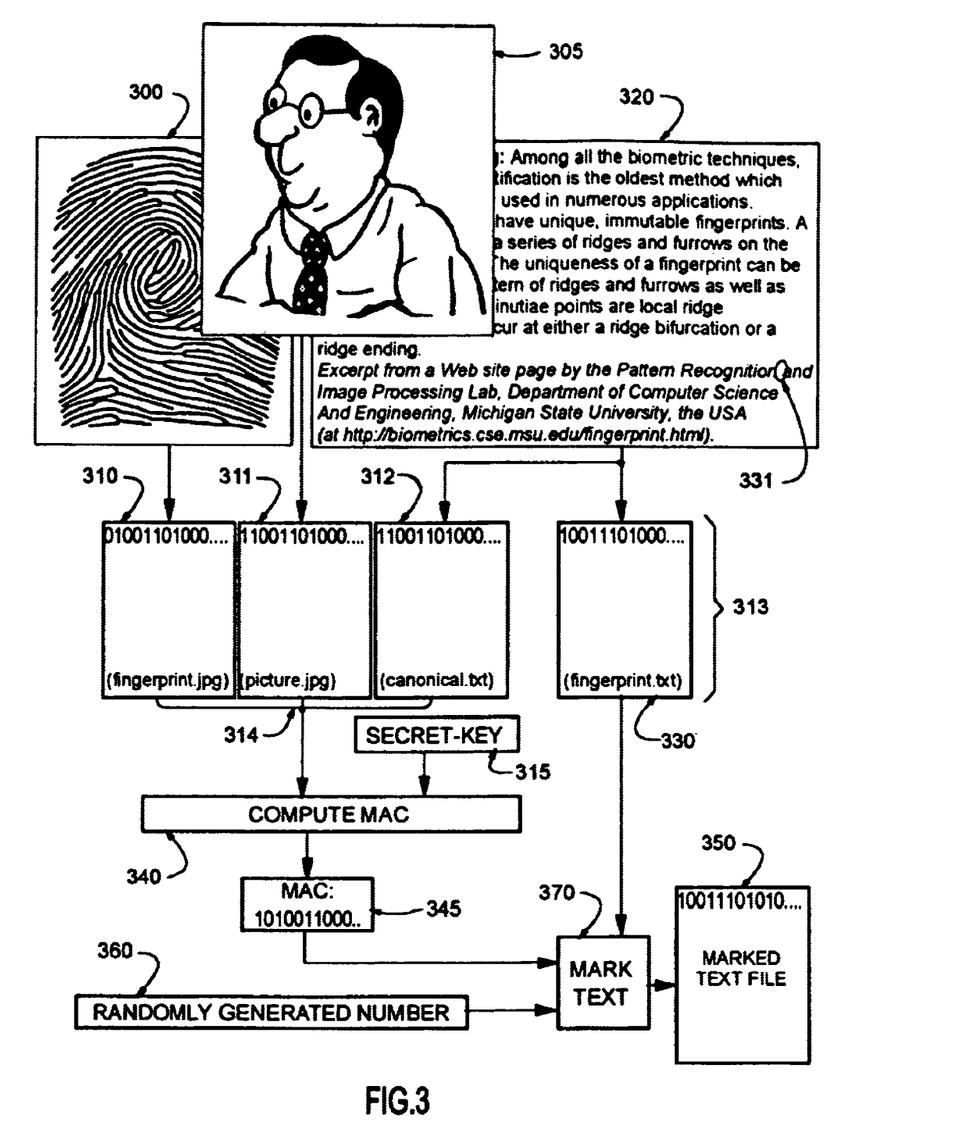
FIG. 3 describes the general case where a plurality of files, including the carrier, are associated.

FIG. 3 further illustrates a general case for the invention assuming that a MAC [345] is not only computed over more than one file (e.g., the files [310, 311] of the two images [300, 305]) but also includes the file of the text document itself [320], that is eventually used to carry [350] the authentication data, so all three pieces form a group [313] that can be authenticated together. Because, in this case, the carrier of the authentication data is concatenated [314] so that it participates in the computation [340] of the MAC, it is implicitly assumed that there exists a canonical form of the carrier and text document file [330] from which an identical file [312] (canonical.txt) may be generated, so that computation performed at generation and at checking can indeed match. In this particular example, since the carrier is the text-document file [330], the modifications that may be brought to the text document and be transparent should consist in changing, in one way or another, the number of inter-word blank characters (like e.g., [331]) of the text. Changing the inter-word blanks would not affect readability whatsoever. Next, a canonical form of the text that must be agreed upon by all parties involved, from which MAC computation must start, may consist in removing all inter-word blank characters or alternatively leaving a predefined fixed number of those blank characters (e.g., one blank between any two words as it is usual in a text document). Thus, the canonical form is, in this particular case, a form of text that can be obtained identically by sender and receiver irrespective of the fact that text has been marked (through the insertion of extra blanks) so as to permit authentication of the set of transmitted files.

Finally, as with other examples of FIGS. 1 and 2, MAC is used, along with a randomly generated number [360] to transparently mark [370] the text file [130] which a carrier [350] uses for the authentication data.

Figure 4:
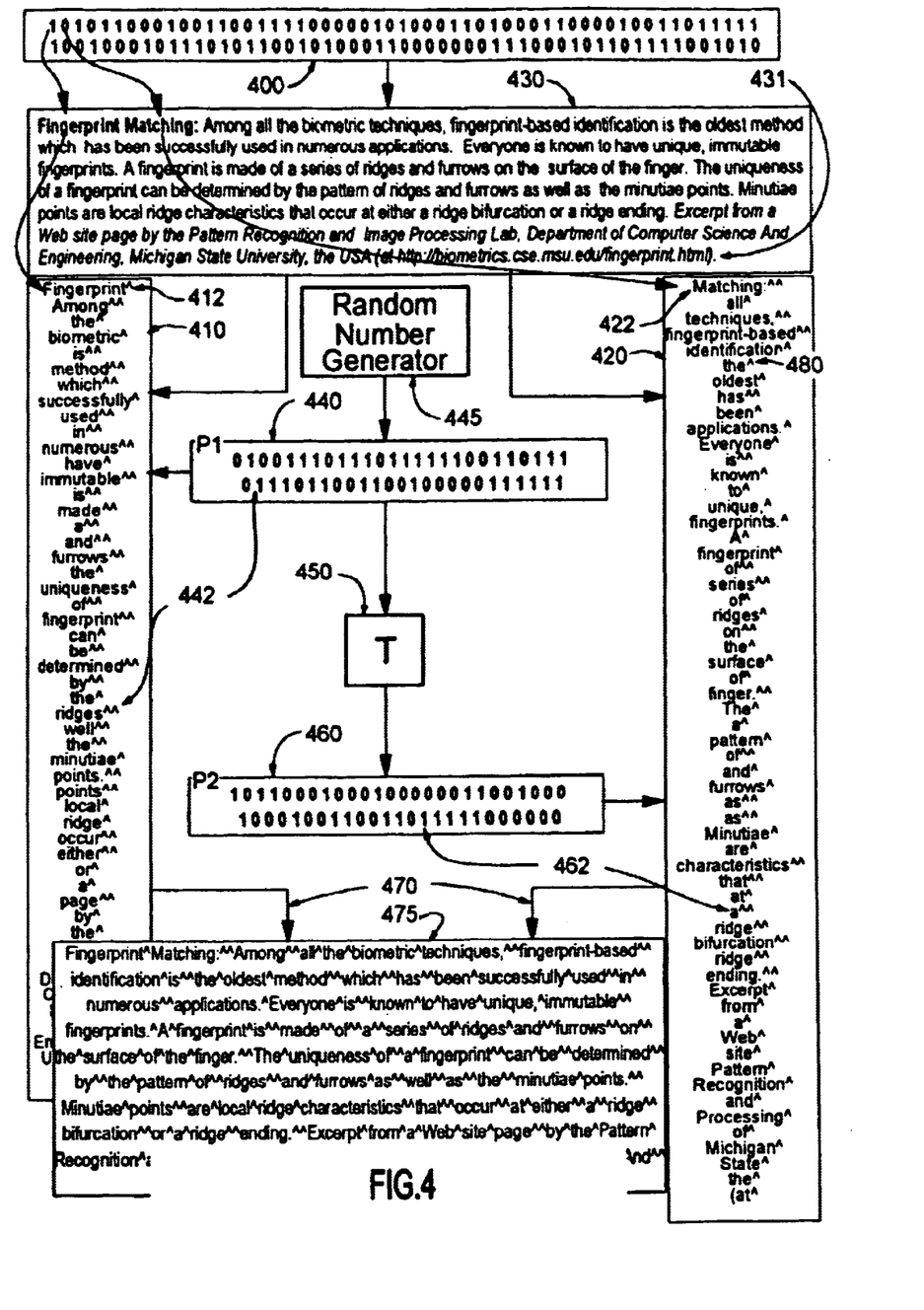
FIG. 4 is a detailed description of how the invention is carried out when the carrier is a plain text file.

FIG. 4 describes the method of the invention to permit the embedding, into the carrier file, of the authentication data so that the information is randomized and hidden. Although this preferred embodiment of the invention is exemplified with the use of a text file as a carrier for the authentication data, it should be clear to those skilled in the art that, without departing from the spirit of the invention, it could be practiced in many different ways that may, or may not, involve a text file. Carrying out the invention assumes that there exists some sort of neutral element in the carrier file which does not alter its meaning or function if present alone or replicated in excess of what is strictly necessary. In accordance with this definition, blank character (x'40' for an ASCII file, here displayed with a caret sign ^ e.g., [480]) is the neutral element for a text document since inserting more blanks than necessary (i.e., one blank), does not alter readability. Also, because there is at least one blank between any two words, there are many opportunities for merging, under the form of extra inter-word blanks, the authentication data if the text is indeed comprised of enough words.

The invention assumes that MAC [400] (computed according to any standard or customary method known from the art) is used here to split the text into two sets of words. This is simply achieved by creating a first set [410] with the words whose positions correspond to the 1's [412] of the MAC binary vector. The second set [420], the complement, corresponds to the 0's [422]. For the sake of simplicity, it is assumed in the description of FIG. 4 that the length of the MAC binary vector matches the number of words of the text [430], even though that may seldom be the case. However, if the text is comprised of more words, as is the common case, all parties involved should agree on what part is to be selected to carry out encoding and checking similarly. Although the simplest method would be to consider using the leading word as carrier text, with the number of leading words used matching the length of the MAC binary vector, many other alternatives are possible, such as selecting the trailing words or another more sophisticated way of selecting the subset of words to be agreed upon beforehand. It is also assumed that the number of words of the shortest carrier text must be large enough to match the length of the binary vector result of the chosen MAC function. Depending upon the level of protection one desires to achieve in a particular application of the invention, the binary MAC vector will have different lengths (e.g., a 160-bit hash is produced with SHA). Thus, carrier text must have at least the corresponding number of words (more exactly, there must be enough inter-word intervals, generally excluding the last word of a text [431]) to permit the use of the complete MAC binary vector. Otherwise, if the MAC cannot be entirely used, due to the fact that the carrier text is too short, the level of protection is reduced accordingly.

The first set of words [410], along with their trailing inter-word blank characters, is marked through the insertion of a random number (RN) of extra blank characters in the set of words. The exact method to achieve this is outside of the scope of the invention. For the sake of clarity, a straightforward way is assumed in this illustration of the invention. That is, RN is generated from any convenient random number generator [445] known or adapted from the art, under the form of a first binary vector P1 [440], for example, fitting into the smallest of the two sets of words. Next, one extra blank is inserted for each interval corresponding to a 1 in P1 e.g., [442]. Although more sophisticated methods and numerous variations for obtaining and inserting a random pattern of extra blanks can be considered, this would not change the scope of the invention which uses the MAC to split the text and insert a random number of extra blanks, instead of directly embedding the MAC into the carrier text uses it to split it and insert a random number of extra blanks instead.

Finally, a second set of words is marked too. That is, starting from P1 [440], a transform function T [450] is applied to get a second pattern P2=T(P1) [460] that must fit into this second set of words. Similar to P1, P2 is used to insert extra blanks into the second set, e.g., [462]. Again, the type of transform T to be used to obtain P2 from P1 is outside of the scope of the invention. Many equivalent alternate ways are possible. The simplest one consists in just reusing P1 as is to fit in the second set. A more elaborate transform is to hash RN so that P2=H(P1), wherein H would be any appropriate hashing function. Here, P2 [460] is just the bit-wise complement of P1. The last operation consists in reassembling [470] the two sets from the pattern of 1's and 0's of the MAC [400], thus obtaining the carrier [475].

Figure 5:
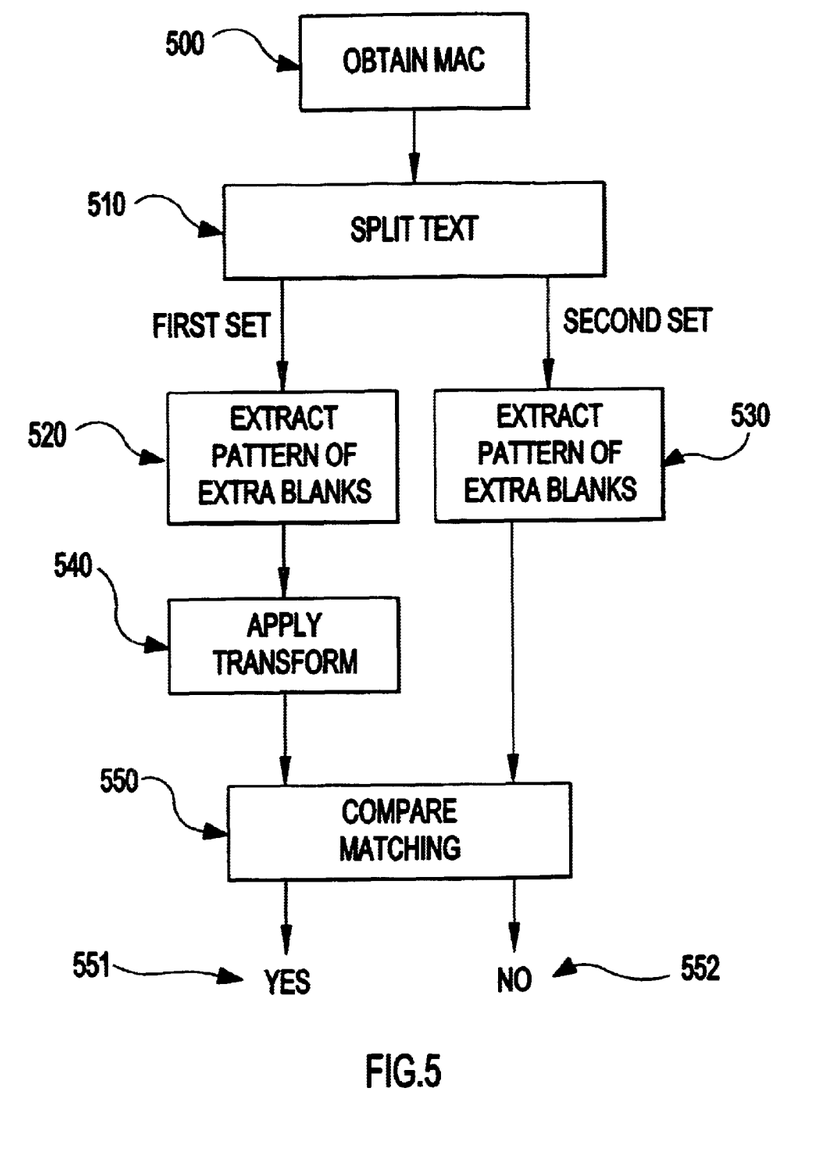
FIG. 5 shows the step of the checking method per the invention.

FIG. 5 depicts an example of the decoding method per the invention when carrier is a plain text document in which extra blanks have been inserted. The description starts when a MAC is re-computed [500], as explained with reference to FIGS. 1, 2 and 3. The operations shown in FIG. 5 are effected in a manner similar to what was shown in FIG. 4. Then, with the MAC binary vector, text is split into a first and a second set. From both sets a pattern of extra blanks is extracted [520, 530]. On the pattern extracted from the first set the same transform as was used for encoding is applied [540]. Finally, if the pattern of extra blanks of the second set matches [551] the transformed pattern of the first set when compared [550], then the files are accepted as authentic. If the comparison fails [552], one or more files of the group of files should be considered as having been compromised.

Figure 6:
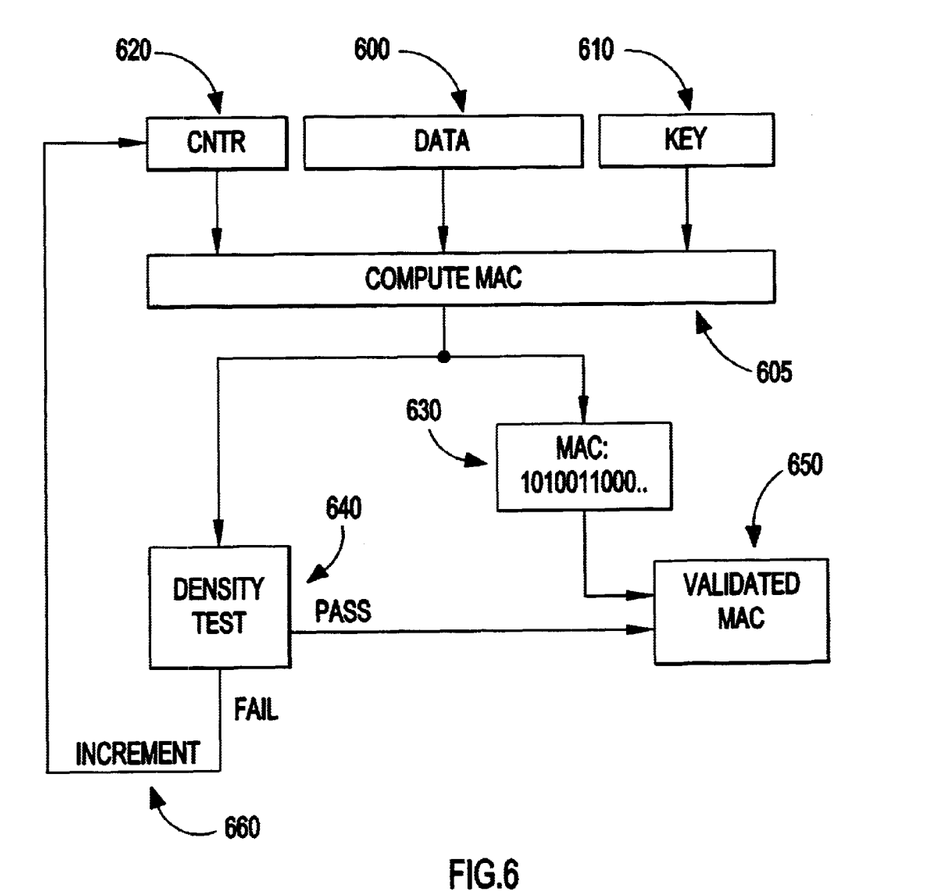
FIG. 6 shows an example of an improved method to obtain an authentication code per the invention.

FIG. 6 elaborates on the preferred structure of the MAC for best carrying out the invention. Although the invention does not require making assumptions on the manner in which a MAC is calculated, it is however worth mentioning the following restrictions. Whichever method is actually retained for computing it, the case in which the MAC has very few 1 bits or very few 0 bits should however be considered (even though the probability of obtaining such a ratio of 0's and 1's is low). Hence, for example, if a 128-bit MAC has 127 one bits and only one 0 bit, that would in effect result in 127 bits of random data that would be encoded into the first set of words (such as [410] in FIG. 4) of the split text and only 1 bit of transformed random data would be encoded into the second set (such as [420]), the latter of which would amount to only one word of the text in this extreme example. In that case, an adversary who substitutes a different text for the real text, would have a probability of 1 in 2 of accidentally passing the verification check. Similarly, if we have a split of 126 and 2 there would be a probability of 1 in 4 of accidentally passing the verification check and so on. Therefore, the optimal situation is when the MAC has the same number of 1's and 0's (i.e., 64 ones and 64 zeros in this example of a 128-bit MAC). Such a balanced MAC would yield the minimum probability of 1 in (2**64). As a consequence, one may optionally want to favor a method for generating MACs that warrants a prescribed number of 0 and 1 bits. Among numerous possibilities, one trivial method is to have a recursive procedure whereby the MAC is computed on the input data [600], a key [610], and a counter [620]. The generated MAC [630] would then be tested [640] to see whether the number of 0 bits and 1 bits satisfies the imposed condition; and, if so, then the MAC would be accepted and used [650]. Otherwise, the counter [620] would be incremented [660] and a new MAC computed, with the procedure continuing until an acceptable MAC is found. Because both the sender and the receiver use the same procedure to generate MACs, and since the first acceptable MAC is taken, the two are assured of making use of the same MAC value.

The invention has been described with reference to several specific embodiments. One having skill in the relevant art will recognize that modifications may be made without departing from the spirit and scope of the invention as set forth in the appended claims.

What is claimed is:

1. A method for uniquely authenticating each replication of a plurality of soft-copy documents, said plurality of soft-copy documents forming a group, comprising the steps of:

dynamically selecting one soft-copy document out of said group to become a carrier for an authentication code aimed at protecting said group;

concatenating said plurality of soft-copy documents, said concatenating including the step of using a canonical form of said selected soft-copy document;

computing an authentication code front said concatenated plurality of soft-copy documents and a predetermined key;

generating a random number; and creating said carrier by combining said random number and said authentication code and marking said selected soft-copy document.

2. The method according to claim 1 wherein said step of concatenating uses all of said plurality of soft-copy documents with the exception of said selected soft-copy document.

3. The method according to claim 1 wherein said step of concatenating is replaced by the step of picking up a single soft-copy document.

4. The method according to claim 1 wherein the creating said carrier comprises the steps of:

splitting said selected soft-copy document into a first set of data and a second set of data on the basis of said authentication code;

utilizing said random number to mark said first set;

transforming said random number;

utilizing said transformed random number to mark said second set; and reassembling said first set and said second set into said carrier.

5. The method according to claim 1 wherein said selected soft-copy document is a plain text document and said first set and said second set comprise sets of words from said plain text document.

6. The method according to claim 5 wherein said plain text document is marked through the insertion of extra blanks.

7. The method according to claim 6 wherein the step of using said canonical form of said plain text document includes the step of:

stripping all interword blank characters, in excess of one, off said plain text document; thereby, obtaining said canonical form.

8. The method according to claim 4 wherein said selected soft-copy document is a plain text document and said first set and said second set comprise sets of words from said plain text document.

9. The method according to claim 8 wherein said plain text document is marked through the insertion of extra blanks.

10. The method according to claim 9 wherein the step of using said canonical form of said plain text document includes the step of:

stripping all interword blank characters, in excess of one, off said plain text document; thereby, obtaining said canonical form.

11. The method according to claim 4 wherein said authentication code, said random number, said transformed random number are binary vectors fitting respectively in said selected soft-copy document, said first set and said second set.

12. The method according to claim 4 wherein said splitting step includes the steps of:

forming said first set with the words from said selected soft-copy document corresponding to the ones of said authentication code; and forming said second set with the words from said selected soft-copy document corresponding to the zeros of said authentication code.

13. The method according to claim 1 wherein said computing step comprises the steps of:

computing said authentication code from said concatenated plurality of soft-copy documents, said key and a counter;

testing said authentication code for a prespecified range of zero values to one values;

if said code does not fall within said prespecified range: incrementing said counter; and
resuming at computing step; and if said code does fall within said prespecified range: validating said authentication code; and exiting said computing step.

14. The method according to claim 4 wherein said computing step comprises the steps of:

computing said authentication code from said concatenated plurality of soft-copy documents, said key and a counter;

testing said authentication code for a prespecified range of zero values to one values;

if said code does not fall within said prespecified range: incrementing said counter; and
resuming at computing step; and if said code does fall within said prespecified range: validating said authentication code; and
exiting said computing step.

15. The method according to claim 4 wherein said transforming step includes:

hashing said random number;

reusing said random number; and inverting said random number.

16. A system for uniquely authenticating each replication of a group of soft-copy documents, comprising:

a selection component for dynamically selecting one soft-copy document out of said group to become a carrier for an authentication code aimed at protecting said group;

a concatenation component for concatenating said plurality of soft-copy documents, said concatenating including the step of using a canonical form of said selected soft-copy document;

a processor for computing an authentication code from said concatenated plurality of soft-copy documents and a predetermined key;

a generating component for generating a random number; and carrier marking means for creating said carrier by combining said random number and said authentication code and marking said selected soft-copy document.

17. The system of claim 16 wherein the carrier marking component comprises:

a splitter component for splitting said selected soft-copy document into a first set of data and a second set of data on the basis of said authentication code;

a transformation component for transforming said random number;

a marking component for utilizing said random number to mark said first set and for utilizing said transformed random number to mark said second set; and an assembly component for reassembling said first set and said second set into said carrier.

18. A program storage device readable by machine tangibly embodying a program of instructions executable by the machine for uniquely authenticating each replication of a plurality of soft-copy documents, said plurality of soft-copy documents forming a group, said method comprising the steps of:

dynamically selecting one soft-copy document out of said group to become a carrier for an authentication code aimed at protecting said group;

concatenating said plurality of soft-copy documents, said concatenating including the step of using a canonical form of said selected soft-copy document;

computing an authentication code from said concatenated plurality of soft-copy documents and a predetermined key;

generating a random number; and creating said carrier by combining said random number and said authentication code and marking said selected soft-copy document.

* * * * *